…

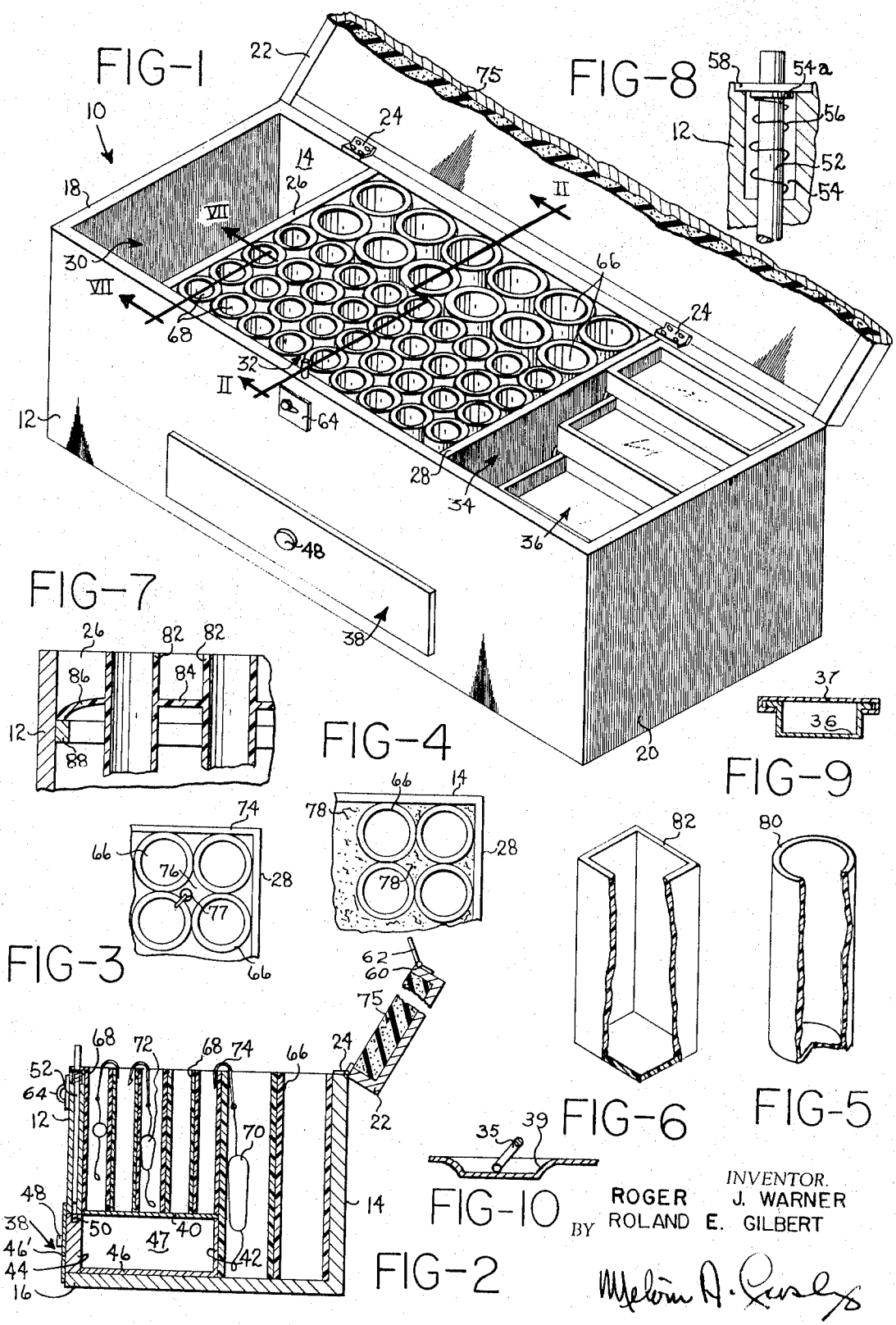

United States Patent Office 3,350,810
Patented Nov. 7, 1967

3,350,810
FISHING TACKLE BOX
Roger J. Warner, 3 W. George St., and Roland E. Gilbert, 402 N. Main St., both of Arcanum, Ohio 45304
Filed Apr. 20, 1965, Ser. No. 449,410
5 Claims. (Cl. 43—57.5)

ABSTRACT OF THE DISCLOSURE

Tackle box having cylindrical tubes to receive lures with the tubes in the front being short to permit a drawer in the box therebeneath and with a member closeable on the tops of the tubes to retain therein lures suspended in the tubes with their hooks hooked on the upper ends of the tubes.

---

This invention relates to a fishing tackle box which is especially designed to provide a plurality of compartments therein for storing various tackle means.

One of the problems existing with known tackle boxes is that these boxes often do not provide enough compartments of varied sizes in which to store the individual tackle means such as fishing lures and, in particular, are lacking in compartments to receive large lures. Another problem with existing tackle boxes is that they do not provide easy access to the individual tackle means such as fishing lures. Furthermore in the usual tackle box, the lures, as well as other equipment in the box, gets tangled up if the box tips over.

Accordingly, an object of this invention is to provide a tackle box which will prevent tangling up of lures and the like if the box is upset, which is economical to produce and has a plurality of compartments therein for storing tackle means, and includes compartments especially designed to hold large lures.

Another object of this invention is to provide a tackle box of the above variety in which the individual tackle means are separately stored in the tackle box and are readily withdrawn therefrom.

Another object of this invention is to provide a tackle box having a drawer therein with locking means operatively connected therewith which prevents opening of the drawer when the cover of the tackle box is closed.

It is also an object to provide a tackle box which will float when in the water.

It is also an object to provide a tackle box construction which will lock closed when the lid is closed.

It is also an object to provide a tackle box construction which will permit stacking of the boxes.

These and other objects and advantages of this invention will become more apparent on reading the following specification and drawings, in which:

FIGURE 1 is a general perspective view of the tackle box of this invention;

FIGURE 2 is a general cross sectional view taken along the lines II—II of FIGURE 1;

FIGURE 3 is a top view of one corner of the compartment containing the plurality of tubes shown in FIGURE 1;

FIGURE 4 is a view similar to FIGURE 3 showing another modification of this invention;

FIGURE 5 is a general perspective view with a portion broken away showing the general shape of one modification of the tubes used;

FIGURE 6 is a view similar to FIGURE 5 showing a tube modification having a generally quadrilaterally shaped cross section;

FIGURE 7 is a cross sectional view of another modification of this invention looking along the general lines VII—VII of FIGURE 1;

FIGURE 8 is an enlarged cross sectional view showing the locking means for the drawer shown in FIGURE 2;

FIGURE 9 is a section through a tray showing a slide lid therefor; and

FIGURE 10 shows a recessed handle.

Referring to the drawings in more detail, FIGURE 1 shows a general perspective view of the tackle box of this invention in which the box is generally designated 10. The box has front and back panels 12 and 14, respectively, and bottom panel 16 along with side panels 18 and 20, which are secured together by known means to form the box shown having an open top. The closure or top of the box 22 is hinged to the back panel 14 by hinges 24 as shown.

The box is divided into a plurality of compartments by the vertical dividers 26 and 28 which are positioned in the box as shown and provide compartments 30, 32 and 34 as shown. Compartment 30 may be used for storing tall objects while compartment 34 is provided with tray means 36 as shown. These tray means 36 are known and are of the type which can be superimposed one above the other in vertical alignment when not in use, and can be positioned laterally to the position shown in FIGURE 1 when it is desired to obtain tackle means from the individual trays. The tray means 36 is suitably secured in compartment 34 by known means.

The center compartment 32 is provided with a drawer means generally designated 38 and better shown in FIGURE 2. The center compartment 32 is provided with a generally horizontally positioned divider 40 which is secured to the dividers 26 and 28 by known means. The drawer 38 consists of a back panel 42 and a front panel 44 which are suitably secured to the bottom panel 46 along with suitable side panels 47. The front panel 44 has a covering panel 46′ secured thereto, and the covering panel 46′ is larger than the hole in the front panel 12.

The drawer having a knob 48 thereon is slidably mounted in the opening in front panel 12 and the bottom panel of the drawer rests upon the bottom panel 16 of the tackle box shown in FIGURE 2.

The front panel 44 of the drawer is provided with a notch 50 therein which is used in conjunction with the plunger 52. The plunger 52 is slidably mounted in front panel 12 as shown in FIGURES 2 and 8. At the upper end of the plunger 52 the panel 12 is provided with an enlarged opening 54 as shown in FIGURE 8. The upper portion of plunger 52 has a flange 54a secured thereto and a spring member 56 is positioned around the plunger in the cavity as shown. The spring biases the plunger 52 away from the notch 50 in the drawer. A suitable aperture plug 58 receives the upper end of plunger 52 and restrains the outward movement of plunger 52.

When the closure or lid of the box is closed, the lip portion 60 of the closure panel 22 engages the upper end of plunger 52 and pushes it downwardly enabling the lower end of plunger 52 to engage notch 50 in drawer 38, thereby locking the drawer of the tackle box when the cover is closed. The cover is provided with a tongue-like latch member 64 of known variety which will enter spring latch 64 on the front of the box when the lid is closed so the box will be latched closed whenever the lid is closed.

The box has a handle 35 which is receivable in a recess 39 in the top of the lid so the lid is flat and the boxes can be stacked.

The center compartment 32 of the tackle box is provided with a plurality of tubes such as tubes 66 and 68 as shown. Tubes 66 may be larger than tubes 68 to accommodate different sized tackle means such as 70 and 72. The tubes are large enough to receive the tackle means such as a fishing lure. The fishing lure, for example, may be positioned in the tube as shown in FIGURE 2.

The bent portion 74 of the hook of the fishing lure may be positioned on the upper end of the tubes as shown with the barbs and eyes of the hook pointing downwardly. By this construction, there is a plurality of compartments provided and in which compartments the individual tackle means may be positioned. The cover 22 is provided with a planar resilient member 75 which is secured to the inside thereof as shown in FIGURES 1 and 2.

After the tackle means are positioned in the individual compartments, the cover is closed as previously mentioned. In closing the cover the resilient member 75 engages the upper ends of tubes 66 and 68, and also engages the bent portions 74 of the hooks thereby holding the hooks in position.

When the cover is open, the individual lures can be readily selected.

FIGURE 3 is a top view of a portion of the tubes shown in FIGURE 1. It should be noted that when the tubes 66 are positioned as shown, there is a void 76 between adjacent tubes as shown in FIGURE 3. This void 76 can be availed of for storing other tackle means 77 in the manner previously described.

FIGURE 4 is a view similar to FIGURE 3. However, the voids are filled with a suitable filling material which helps maintain the tubes in a fixed position relative to one another. The tubes as used in this invention may be of the tubular circular type 80 shown in FIGURE 5 or the tubes may have a quadrilaterally-shaped cross section as shown by the tubes 82 in FIGURE 6. The tubes may have two open ends as shown in FIGURE 2, or they may have one closed end as shown in FIGURES 5 and 6.

FIGURE 7 shows another modification of this invention. The plurality of tubes which are stored in compartment 32 may be secured together along their sides to produce a mass of tubes which may be inserted as a unit in the central compartment 32. The tubes, such as 82 shown in FIGURE 7 may be joined by a connected member 84 as shown, and the entire unit so joined may have a flange member 86 around the perimeter of the unit so formed. The unit of tubes so formed will have a general shape conforming to that of the compartment in which it is to be inserted, and the compartment is provided with a lip member 88 which is secured around the perimeter of the compartment, and upon which lip member flange 86 would rest to support the plurality of tubes in the compartment.

While the plurality of tubes is shown in the central compartment of the tackle box, it is, of course, understood that it may be positioned in one of the other compartments. It should also be noted that the tubes as shown in FIGURE 2 have different lengths with some of the tubes 66 resting on the bottom panel 16 and the remainder of the tubes 68 resting upon the divider 40.

The tackle box of this invention may be made of wood which is suitably joined to form the construction shown and may be painted in attractive colors or the box may be made of suitable durable plastic materials which are especially useful when the tackle box is used in salt water areas.

The tubes may also be conveniently made of plastic which are economical to produce and are also attractive. The tubes may be adhesively secured along their contacting sides for the embodiment shown in FIGURE 1 for example.

In making the embodiment shown in FIGURE 7, a generally flat planar member of plastic, for example, is apertured to receive the tubes 82. The tubes 82 are then inserted in the apertures and adhesively secured therein to form the mass of tubes which is inserted in the compartment as previously explained. While the tubes are shown in a substantially vertical position, they may be positioned in the box at a slight angle to the vertical.

The trays 36 are preferably provided with slide lids 37 (FIGURE 9) to prevent the tray contents from spilling out if the box is turned over.

It will be noted that the trays are so arranged that the box will not tip over when the trays are lifted. Some boxes with trays fastened to the parts of a divided lid will tip over unless both lid parts are opened.

The compartments for the lures isolates them from reel oil and insect repellent and like materials found in tackle boxes, and which could soil or damage the lures. The compartments, furthermore, prevent the lures from becoming entangled when the box is tipped over.

The box, according to the present invention will not easily sink if dropped in the water, and may have either a metal or wooden outside, as may be desired.

It will be understood that this invention is susceptible to modification in order to adapt it to different usages and conditions; and accordingly, it is desired to comprehend such modifications within this invention as may fall within the scope of the appended claims.

What is claimed is:

1. A tackle box having front, rear, bottom and side panels joined to form a box having an open top, a plurality of dividers vertically positioned in said box to form a plurality of compartments therein, one of said compartments having a lip secured around the inside perimeter of said compartment, a plurality of tubes having their axes in parallel relation to one another and one end of each of said tubes lying substantially in the same plane and adapted to receive a fishing lure, said tubes being secured to one another with said tubes en masse forming a shape which is adapted to be inserted in said one compartment, said tubes en masse having a flange extending around the perimeter of said shape with said flange being adapted to rest on said lip when said plurality of tubes is inserted in said one compartment, a cover panel hinged to said rear panel to close said top, resilient means secured on the inside of said cover panel, said resilient means comprising foam rubber in sheet form and adapted to resiliently engage said one end of said tubes and thereby retain said fishing lures in position on said upper ends.

2. A tackle box comprising; a container having a bottom wall and front and back and side walls and having an open top, a closure hingedly joined to said container at the top of said back wall adapted to cover said top, a plurality of cylindrical tubes positioned substantially vertically in said container in side by side relation and each said tube having an upper end adapted to engage a hook portion on the end of tackle means hanging in the said tube, the upper ends of said tubes terminating near the top of said container and being coplanar, retaining means mounted on said closure and adapted to engage said upper ends of said tubes and hold the hook portions of said tackle means in position on said upper ends, at least some of said tubes adjacent said front terminating in spaced relation to said bottom wall, said front wall having an opening near the bottom, and a drawer extending through said opening and into the space beneath said some of said tubes.

3. A tackle box according to claim 2 in which said retaining means comprises resilient material which overlies and resiliently engages the upper ends of said tubes.

4. A tackle box having front, rear, bottom and side panels joined to form a box having an open top, at least one divider vertically positioned in said box and extending from the bottom panel to near the top of the box and from the front panel of the box to the back panel thereof and dividing the box into compartments, a horizontal divider parallel to and spaced from said bottom panel and secured to one side panel of the box and to said divider to form a sub-compartment in one of said compartments, said front panel having an opening therein leading into said sub-compartment, drawer means slidably mounted in said opening and sub-compartment, a plurality of cylindrical tubes vertically positioned in said one compartment and each tube having an upper end adapted to receive tackle means suspended therein by engaging a hook portion of the tackle means over the upper end of a respective tube, said tubes having lower ends some of which rest on said bottom panel and others of which rest on said horizontal divider, the upper ends of all of said tubes lying substantially in a plane parallel to said bottom panel and near the top of the box, a cover panel hinged to said rear panel to close said top of said box, means secured to said cover panel adapted to be confined between the upper ends of said tubes and said cover panel and operable to engage the upper ends of said tubes when said cover panel closes said top of the box and thereby retains said tackle means in said tubes.

5. The tackle box as claimed in claim 4 in which each said tube has an internal diameter sufficiently large to receive tackle means in the form of at least one fishing lure therein, said tubes having closed lower ends and being in side by side relation and providing spaces therebetween in which additional lures may be inserted with hook portions engaging over the upper end of an adjacent tube.

References Cited

UNITED STATES PATENTS

| | | | |
|---|---|---|---|
| 952,314 | 3/1910 | Ellsworth | 43—57.5 |
| 1,752,948 | 4/1930 | Herrmann. | |
| 1,976,765 | 10/1934 | Berry | 312—244 |
| 2,286,427 | 6/1942 | Levensten | 312—222 |
| 2,711,050 | 6/1955 | McIntyre | 43—57.5 |
| 3,000,685 | 9/1961 | Gross | 312—222 X |
| 3,182,872 | 5/1965 | Brosseau | 43—57.5 X |

FOREIGN PATENTS

| | | |
|---|---|---|
| 90,629 | 12/1957 | Norway. |

SAMUEL KOREN, *Primary Examiner.*

D. J. LEACH, *Assistant Examiner.*